July 24, 1956  J. D. BROWN  2,755,836
COMMINUTING CHOPPER HAVING A ROTATABLE FEED SCREW
Filed Sept. 3, 1952
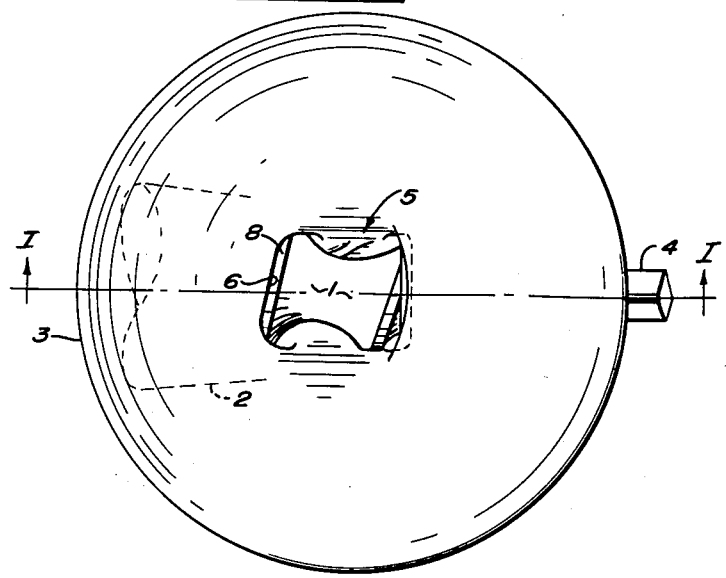
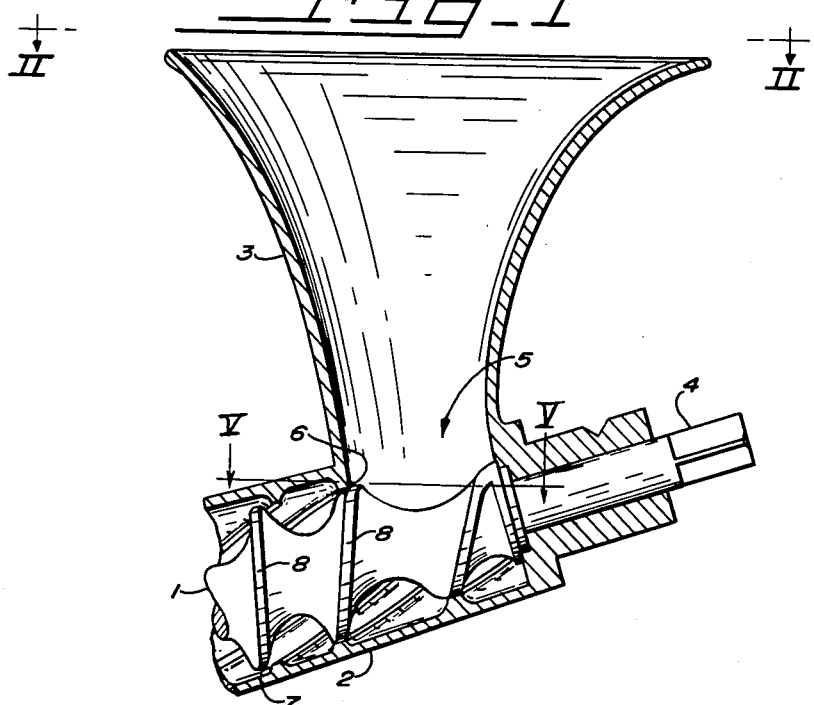
INVENTOR.
JAMES D. BROWN
BY
ATTORNEYS July 24, 1956   J. D. BROWN   2,755,836
COMMINUTING CHOPPER HAVING A ROTATABLE FEED SCREW
Filed Sept. 3, 1952   2 Sheets-Sheet 2
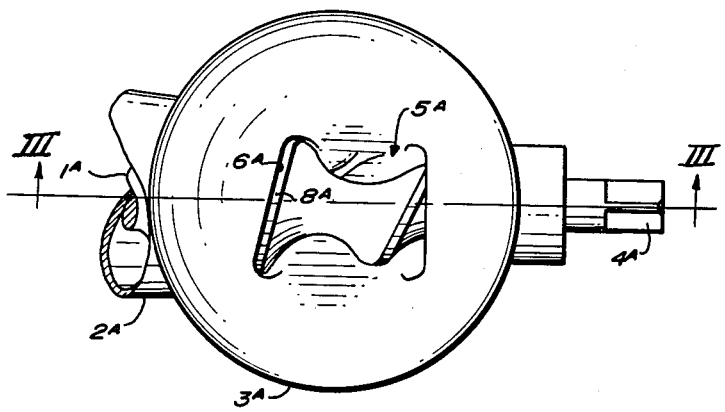
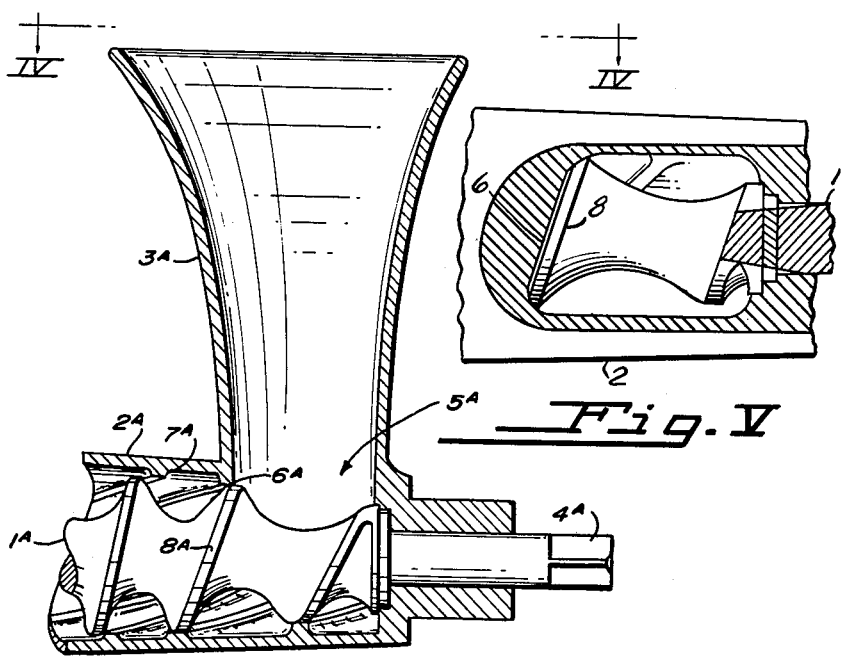
INVENTOR.
JAMES D. BROWN
ATTORNEYS United States Patent Office 2,755,836
Patented July 24, 1956

2,755,836

COMMINUTING CHOPPER HAVING A ROTATABLE FEED SCREW

James D. Brown, Toledo, Ohio, assignor to Toledo Scale Company, Toledo, Ohio, a corporation of New Jersey Application September 3, 1952, Serial No. 307,598

4 Claims. (Cl. 146—182)

This invention relates to meat chopping machines and in particular to improved means for increasing the output of commodity comminuted by such a machine.

When a substance such as meat was chopped in a prior art chopping machine, a back pressure often was created in the chopper cylinder due to the nature of the substance. The shape of the opening through which the commodity was fed was generally round or oval at the point where the substance entered the chopper cylinder. The back pressure created in the cylinder often tended to push some of the material back through the opening and an oval or round opening permitted it to do so.

The principal object of this invention is to provide means for minimizing the regurgitation effect of back pressure which often builds up in a chopper cylinder.

Another object is to utilize the back pressure which builds up in the chopper cylinder to increase the output of the commodity chopped by the machine.

Another object of the invention is to provide a meat chopping machine having an opening into a chopper cylinder, which opening is so shaped as to increase the output of material comminuted.

Still another object is to provide a meat chopping machine which permits easy and rapid feeding of the commodity to be comminuted.

Other objects and advantages will be apparent from the following description in which reference is had to the accompanying drawings.

According to the invention, as a commodity is fed into a feeding chamber which has a throat opening into a chopper cylinder, a feed screw having a spiral rib is rotated by power means to carry the meat through the chopper cylinder to a discharge end of the cylinder where the commodity is comminuted. The throat has two sides which are parallel to the axis of the feed screw and a front edge at the point of intersection of the chopper cylinder and feeding chamber, the front edge being angular with respect to the sides of the throat. The portion of the spiral rib on the feed screw which coacts with the front edge of the throat similarly is at an angle so as to be generally parallel to the front edge. When looking downwardly into the feeding chamber as the feed screw is rotated, the front edge of the throat and the cooperating portion of the spiral rib appear to coincide when the rib on the feed screw shears off a portion of the commodity against the front edge of the throat.

In the drawings:

Figure I is a fragmentary vertical sectional view of a chopping mechanism taken along the line I—I of Figure II of the preferred type embodying the invention.

Figure II is a plan view of the mechanism shown in Figure I, and is taken substantially along line II—II of Figure I.

Figure III is a fragmentary vertical sectional view taken along the line III—III of Figure IV illustrating a modification of the invention.

Figure IV is a plan view taken substantially along line IV—IV of Figure III.

Figure V is an enlarged horizontal sectional view taken substantially along the line V—V of Figure I.

These specific figures and the accompanying description are intended merely to illustrate the invention but not to limit its scope.

Referring to Figure I, a feed screw 1 is rotatably mounted in a chopper cylinder 2 to carry a commodity fed into a feeding chamber 3 toward a discharge end of the chopper cylinder 2 where the commodity is comminuted. The screw 1 is provided with a squared end 4 which engages with drive means adapted to rotate the screw. In the preferred embodiment of the invention shown in Figures I and II, the chopper cylinder 2 and the screw 1 located therein are inclined slightly to the horizontal. The feeding chamber 3 is preferably formed integrally with the cylinder 2 and stands vertically on the cylinder.

The driving means for the screw 1 and the means by which the chopping mechanism may be mounted on a chopping machine are not shown. Any type of drive means may be employed with the instant invention.

A throat 5 is formed at the intersection of the feeding chamber 3 and the inclined chopper cylinder 2. From above, the throat 5 appears to have two sides which are parallel to the axis of the screw 1, a rear edge connecting the two sides which rear edge is transverse to the axis of the screw, and a front edge 6 which is angular with respect to the sides of the throat 5. The corners of the throat are rounded slightly to provide a smooth surface to facilitate feeding and cleaning of the device.

Spiral ribs 7 and 8 are formed on the inside of the chopper cylinder 2 and on the feed screw 1 respectively. A portion of the rib 8 is adapted, as the screw 1 is rotated, to engage with the front edge 6 of the throat to shear off some of the commodity being fed into the feeding chamber 3. That portion of the spiral rib 8 on the feed screw which engages with the front edge 6 of the throat is parallel to the front edge 6 when the feeding takes place.

By providing such an opening from the feeding chamber 3 into the chopper cylinder 2, a back pressure which may have been built up in the cylinder 2 is not able to push the material back through the opening. Instead, that back pressure will tend to increase the output of the material chopped at the discharge end of the cylinder. Prior art devices having round, oval, or otherwise symmetrically shaped throats or openings were limited in the ease and speed of feeding and in output of commodity chopped since the commodity often would move back out through the throat of the feeding chamber.

The modification shown in Figures III and IV has a horizontal feed screw 1a rotatably mounted in a chopper cylinder 2a, and a feeding chamber 3a extending vertically upward from the cylinder. The main difference between the device shown in these figures and the preferred embodiment of the invention is that the cylinder 2a and screw 1a are horizontal rather than downwardly inclined as in Figures I and II. Otherwise the two modifications are substantially similar. It has been found that the instant invention has a greater output of commodity comminuted if the chopper cylinder is inclined downwardly from the horizontal. The invention should not be limited to choppers having inclined cylinders however, and has therefore also been shown incorporated with a cylinder other than inclined.

Various changes may be made in the details of construction without departing from the spirit and scope of the invention.

Having described the invention, I claim:

1. In a comminuting chopper having a feeding chamber opening into a chopper cylinder and having a rotatable feed screw, in combination, a spiral rib on said feed screw, said rib being adapted to carry a commodity being comminuted toward a discharge end of the cylinder, and a throat having a front edge at the intersection of the feeding chamber and chopper cylinder on the side of said throat nearest the discharge end of the cylinder, all of said front edge mating with the spiral rib on the screw coacting therewith and said front edge being disposed generally in a plane which is at an acute angle to the axis of the feed screw.

2. In a comminuting chopper having a feeding chamber opening into a chopper cylinder and having a rotatable feed screw, in combination, a spiral rib on the feed screw which is adapted to carry a commodity being comminuted toward a discharge end of the cylinder, and a throat having a front edge that is at the intersection of the feeding chamber and the chopper cylinder on the side of the throat toward said discharge end of the cylinder and that cooperates with the spiral rib on the feed screw, said front edge curving at its ends into side portions of the throat but being disposed generally in a plane which is at an acute angle to the axis of the feed screw and said front edge having a contour which mates with that part of the spiral rib on the feed screw which cooperates therewith.

3. A chopper cylinder for a comminuting chopper having a feed screw with a spiral rib adapted to carry a commodity being comminuted toward a discharge end of the chopper cylinder, said chopper cylinder including a downwardly inclined commodity feeding chamber having a throat opening into said chopper cylinder, said throat having its front edge curving at its ends into side portions of the throat but being disposed generally in a plane which is at an acute angle to the axis of the feed screw and said front edge having a contour which coincides with that portion of the spiral rib on the feed screw which cooperates therewith.

4. A chopper cylinder for a comminuting chopper having a feed screw with a spiral rib adapted to carry a commodity being comminuted toward a discharge end of the chopper cylinder, said chopper cylinder including a commodity feeding chamber having a throat opening into said chopper cylinder, said throat having two longitudinally extending sides which are generally parallel to the axis of the feed screw and a front edge curving at its ends into said sides but being disposed generally in a plane which is at an acute angle to said generally parallel sides and said front edge having a cutting surface which coincides with the cooperating portion of the spiral rib on the feed screw when the rib is rotated and shears off a portion of a commodity against said cutting surface.

References Cited in the file of this patent

UNITED STATES PATENTS

| | | |
|---|---|---|
| 1,545,514 | Pfouts | July 14, 1925 |
| 1,889,688 | Middleton | Nov. 29, 1932 |
| 2,531,158 | Robinson | Nov. 21, 1950 |
| 2,655,967 | Mallory | Oct. 20, 1953 |

FOREIGN PATENTS

| | | |
|---|---|---|
| 6,504 | Great Britain | Apr. 29, 1899 |